United States Patent
Han

(10) Patent No.: US 9,762,391 B2
(45) Date of Patent: *Sep. 12, 2017

(54) CHIP AUTHENTICATION TECHNOLOGY USING CARBON NANOTUBES

(71) Applicant: International Business Machines Corporation, Armonk, NY (US)

(72) Inventor: Shu-Jen Han, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,695

(22) Filed: Nov. 30, 2015

(65) Prior Publication Data

US 2016/0373256 A1 Dec. 22, 2016

Related U.S. Application Data

(63) Continuation of application No. 14/744,241, filed on Jun. 19, 2015.

(51) Int. Cl.
| | |
|---|---|
| H04L 9/00 | (2006.01) |
| H04L 9/32 | (2006.01) |
| H01L 27/28 | (2006.01) |
| H01L 51/00 | (2006.01) |
| H01L 51/05 | (2006.01) |
| G06K 7/10 | (2006.01) |

(Continued)

(52) U.S. Cl.
CPC .......... *H04L 9/321* (2013.01); *G06K 7/10297* (2013.01); *G06K 19/0723* (2013.01); *G09C 1/00* (2013.01); *H01L 27/283* (2013.01); *H01L 51/0048* (2013.01); *H01L 51/0558* (2013.01); *H04L 9/0866* (2013.01); *H04W 12/06* (2013.01); *H04W 12/10* (2013.01); *H04L 9/32* (2013.01); *H04L 2209/805* (2013.01); *H04W 12/02* (2013.01); *H04W 12/04* (2013.01)

(58) Field of Classification Search
CPC . H04L 9/30; H04L 9/3278; H04L 9/38; H04L 9/0866; G06K 7/10297; H01L 27/283; H01L 51/0048; H01L 51/0558; H04W 12/04

See application file for complete search history.

(56) References Cited

U.S. PATENT DOCUMENTS

| | | | | |
|---|---|---|---|---|
| 5,301,143 A | * | 4/1994 | Ohri | G11C 5/06 365/225.7 |
| 2006/0281013 A1 | * | 12/2006 | Kurt | G06K 19/16 430/1 |

(Continued)

OTHER PUBLICATIONS

List of IBM Patents or Patent Applications Treated as Related; (Appendix P), Filed Feb. 24, 2016, 2 pages.

(Continued)

*Primary Examiner* — Brandon Hoffman
*Assistant Examiner* — Helai Salehi
(74) *Attorney, Agent, or Firm* — Cantor Colburn LLP; Vazken Alexanian

(57) ABSTRACT

Embodiments relate to the authentication of a semiconductor. An identification circuit disposed within a package of an integrated circuit, and the identification circuit includes carbon-nanotube transistors configured to generate an encryption key.

8 Claims, 9 Drawing Sheets

(51) Int. Cl.

| | | |
|---|---|---|
| *H04L 9/08* | (2006.01) | |
| *H04W 12/10* | (2009.01) | |
| *H04W 12/06* | (2009.01) | |
| *G06K 19/07* | (2006.01) | |
| *G09C 1/00* | (2006.01) | |
| *H04W 12/04* | (2009.01) | |
| *H04W 12/02* | (2009.01) | |

(56) References Cited

U.S. PATENT DOCUMENTS

| | | | | |
|---|---|---|---|---|
| 2009/0213649 | A1* | 8/2009 | Takahashi | G06Q 20/341 |
| | | | | 365/184 |
| 2013/0232587 | A1* | 9/2013 | Boday | B82Y 15/00 |
| | | | | 726/34 |
| 2015/0108429 | A1* | 4/2015 | Uppili | H01L 29/78696 |
| | | | | 257/20 |

OTHER PUBLICATIONS

Shu-Jen Han, et al., "Chip Authentication Technology Using Carbon Nanotubes", U.S. Appl. No. 14/744,241, filed Jun. 19, 2015.

\* cited by examiner

CHIP AUTHENTICATION TECHNOLOGY USING CARBON NANOTUBES

DOMESTIC PRIORITY

This application is a continuation of U.S. Non-Provisional application Ser. No. 14/744,241, entitled "CHIP AUTHENTICATION TECHNOLOGY USING CARBON NANOTUBES", filed Jun. 19, 2015, which is incorporated herein by reference in its entirety.

BACKGROUND

The present invention relates generally to semiconductors, and more specifically, to semiconductor chip authentication.

Authentic semiconductor components are verified by semiconductor manufacturers to meet graded specifications. As a part of the testing and verification process, labels that identify the semiconductor component may be placed on a viewable surface, such as a semiconductor package. However, information contained on the label, for example, can be easily altered. Also, identifiable information may be programmed within memory such as electrically erasable programmable read-only memory (EEPROM). Memory such as EEPROM can be duplicated and has a limited lifetime.

Given the relatively small size of semiconductor components, surface identification of authentic chips may also be difficult. The use of readily available on-chip identification can lead to tamper which may include, but is not limited to, a duplication or a counterfeit substitute in place of the original integrated circuit within the package.

SUMMARY

Embodiments include systems and a method of manufacture for providing authentication of a semiconductor assembly. According to an embodiment of the present invention, an identification circuit is disposed within a package of an integrated circuit, and the identification circuit includes carbon-nanotube transistors configured to generate an encryption key.

According to another embodiment of the present invention, a system for authenticating an integrated circuit comprises an identification circuit disposed within a package of an integrated circuit, the identification circuit includes carbon-nanotube transistors configured to generate an encryption key, the identification circuit encrypts a challenge with the encryption key, thereby generating an encrypted challenge, and a server configured to wirelessly communicate with the identification circuit, the server stores the encryption key, the server decrypts the encrypted challenge thereby generating a decrypted challenge, the server compares the decrypted challenge to the challenge to verify that the decrypted challenge is identical to the challenge.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Counterfeit semiconductor components generally do not meet minimal quality standards and may not work properly if installed in commercial or military systems. Packaging and the dimensions of an authentic semiconductor component may be possible for a counterfeiter to duplicate. The underlying hardware can be more difficult to duplicate, along with any authentication mechanisms with the hardware. An authentication mechanism that provides encrypted information from within the semiconductor packaging is often cost-prohibitive to duplicate. Specifically, an authentication mechanism that uses carbon-nanotubes as an encryption mechanism does not degrade over time and provides an identifier that is unique to the semiconductor component.

Figure 1:
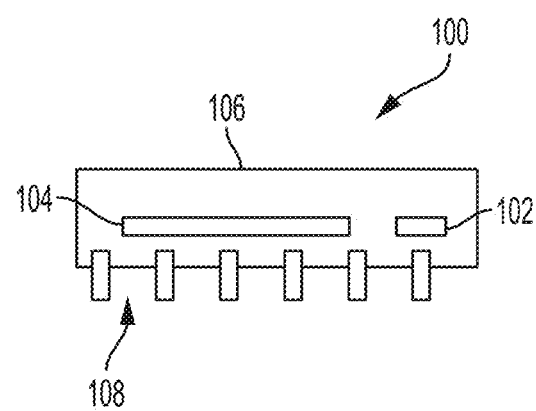
FIG. 1 illustrates an exemplary semiconductor assembly with an identification (ID) circuit in accordance with an embodiment.

FIG. 1 illustrates an exemplary semiconductor assembly 100 with an identification (ID) circuit 102 in accordance with an embodiment. In this embodiment, the ID circuit 102 is a radio-frequency identification (RFID) tag with a CNT array. However, other types of ID circuits with CNT arrays are contemplated. Specifically, in FIG. 1, the semiconductor assembly 100 includes a semiconductor component 104, such as an integrated circuit, enclosed in a package 106. Electrical contacts 108 extend from the package 106 and may provide an electrical connection with elements of the semiconductor component 104.

In some embodiments, the ID circuit 102 may be a passive standalone tag that is not connected to the semiconductor component 104. The ID circuit 102 may be tied to the semiconductor assembly 100 at the time of manufacture. Therefore, the semiconductor assembly 100 may be identified by the ID circuit 102 after placement on a circuit board, for example. As described in more detail below, the ID circuit 102 may be at least a part of a system that engages a server, for example, in an encrypted verification process. The verification process may confirm the authenticity of the semiconductor assembly 100. The unique properties of the CNT array may be used to generate an encryption key used in the encrypted verification process.

Figure 2:
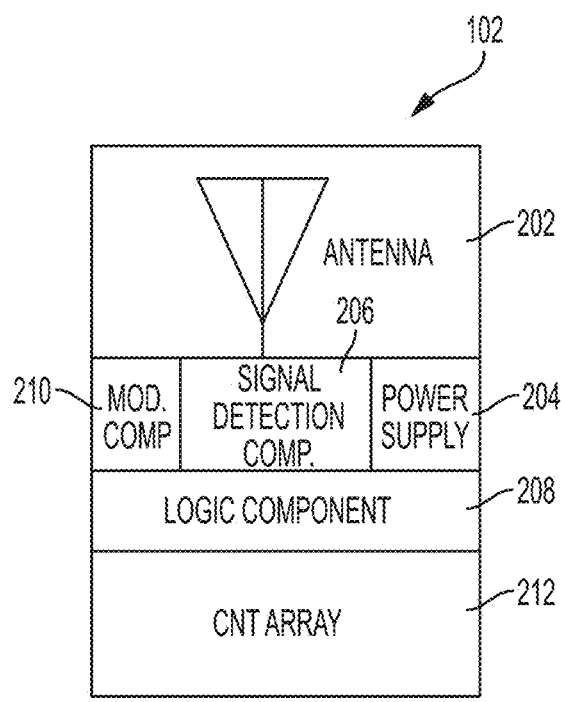
FIG. 2 depicts elements of the ID circuit in accordance with one embodiment.

Referring to FIG. 2 with continuing reference to FIG. 1, FIG. 2 shows one example of elements of the ID circuit 102 in accordance with one embodiment. The ID circuit 102 may include an antenna 202, a power supply 204, a signal detection component 206, a logic component 208 and modulation component 210. The power supply 204 generates supply voltages for at least the signal detection component 206, the logic component 208, the modulation component 210 and the CNT array 212. The modulation component 210 is configured to receive radio-frequency information received by the antenna 202. The modulation component 210 may modulate the received radio-frequency information into a signal to be applied to the CNT array 212 through the logic component 208. The logic component 208 may include an encryption engine. As described in more detail below, the logic component 208 may store an encryption key that is generated based on the resistive properties of the CNT array 212.

Figure 3A:
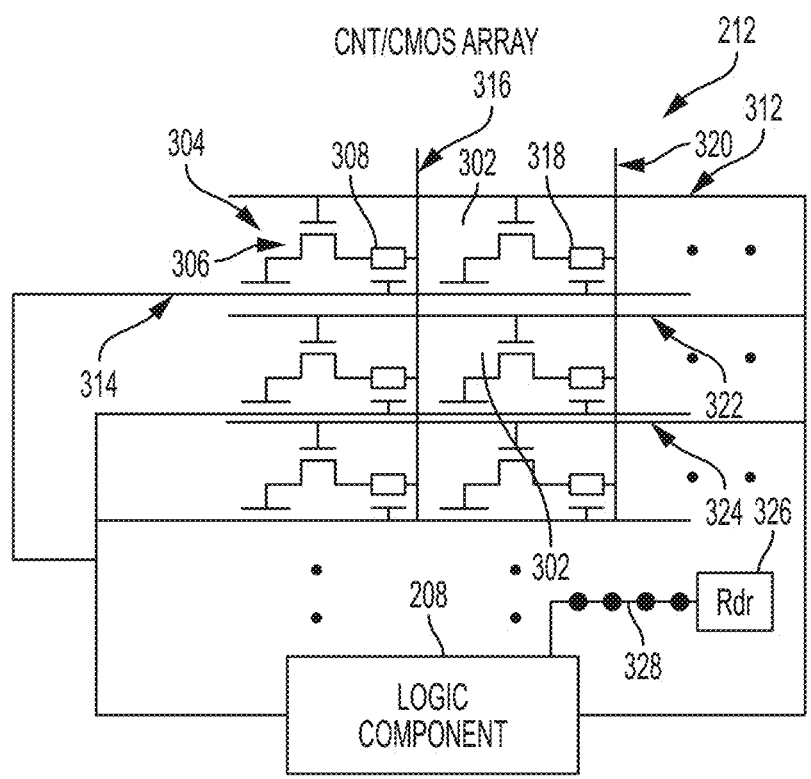
FIG. 3A illustrates a partial view of a carbon nanotube transistor array in accordance with an embodiment.

FIG. 3A depicts a portion of the CNT array 212. The CNT array 212 includes a plurality of cells 302. A cell 304 of the plurality of cells 302 includes a silicon transistor 306 electrically connected to a CNT transistor 308. A gate terminal of the silicon transistor 306 is connected to a first row enable line 312, and a gate terminal of the CNT transistor 308 is connected to a first CNT activation line 314. A drain terminal of the CNT transistor 308 is connected to an output line 316 of the CNT array 212.

A level of resistance is unique to the CNT transistor 308. The resistive properties of CNT transistors may vary randomly from one another, and the resistive properties of the CNT transistors may be permanently set from the time of manufacture. Thus, the CNT array 212 may include a plurality of CNT transistors with different resistive properties. Although the CNT resistance levels are unique for a specific CNT, the resistance of CNT transistors may be grouped into a category based on a determined resistance level. These categories include CNT transistors having metallic (low) resistive properties, high resistive properties, and semiconductive resistive properties. Since the CNT transistors are randomly disposed within an array, and the CNT resistances can vary from one CNT to another, the resistive make-up of the array is unique. As a result, resistive properties can be used to determine a unique encryption key based on the CNT distribution. The unique encryption key can be used in a verification process for the semiconductor component.

Figure 3B:
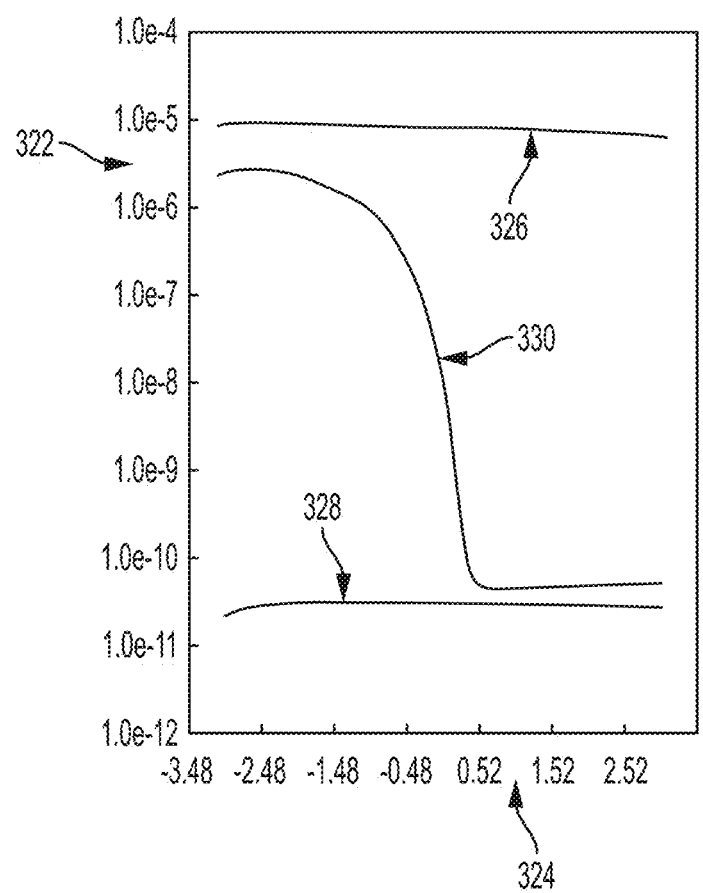
FIG. 3B illustrates resistive properties of carbon nanotube transistors in accordance with an embodiment.

FIG. 3B depicts the varying resistive properties of CNT transistors. A voltage and current relationship for various CNT transistors is shown in FIG. 3B. A conducted current value is represented by the vertical axis 322, where an gate voltage value is represented by the horizontal axis 324. For a CNT with metallic properties (e.g. a resistance of less than 1 kilo ohm) as represented by line 326, the current conducted does not change when the gate voltage is varied. As an example, the current conducted for gate voltages ranging from −3V to 3V is approximately $1.0e^{-5}$ A.

Similarly, the current conducted by a CNT with high resistive properties (e.g. a resistance of greater than 1 mega-ohm) does not change for a set of gate voltages. This results in CNT with high resistive properties behaving similar to an open circuit. For example, a CNT with high-resistive properties is shown by second line 328. A low amount of current (i.e. approximately $1.0e^{-10}$ A) is conducted for gate voltages ranging from −3V to 3V. This low amount of current is from the gate leakage, not from a CNT connection. The CNT with high resistive properties originates from a tube not being formed between source and drain electrodes during fabrication.

CNT transistors with semi-conductive properties are shown by third line 330. The resistance values change depending on the gate voltage applied. As an example, for gate voltages ranging from −3V to approximately −1V, a current of $1.0e^{-5}$ A is conducted. The CNT transistors with semi-conductive properties may have a resistance of less than 1 ohm for a gate voltage of −3V, for example.

As the gate voltage of CNT transistors with semi-conductive properties increases from −1V to approximately 0.5V, the CNT transistors with semi-conductive properties become less conductive (i.e., resistance increases), limiting current flow as the gate voltage increases. For gate voltages greater than approximately 0.5V, the CNT with semi-conductive properties conduct a relatively small leakage current (i.e. approximately $1.0e^{-10}$ A) flows through the CNT. The CNT transistors with semi-conductive properties may have a resistance of greater than 1 kilo-ohm for a gate voltage of 3V, for example.

Referring back to FIG. 3A, a determination of the resistive properties of the CNT transistors of the CNT array 212 can be made at the wafer level, before the semiconductor enters the supply chain. In particular, an encryption key can be derived based on the resistive properties of the CNT transistors within the CNT array 212, and the encryption key can be protected after the encryption key is created.

As an example, resistive properties of a first CNT transistor 308 and a second CNT transistor 318 may be determined. A first row enable line 312 is selectively activated by the logic to allow resistive properties of the first CNT transistor 308 and the second CNT transistor 318 to be determined. The first row enable line 312 can be activated by applying a voltage indicative of a logic 1 (e.g., >1 V).

The resistive properties of the first CNT transistor 308 and the second CNT transistor 318 are read on first output line 316 and second output line 320, respectively. A logic 0 voltage (e.g., <0V) is applied to the remaining row enable lines, for example a second row enable line 322 and third row enable line 324. Thus, the silicon transistors connected to the second row enable line 322 and the third row enable line 324 are turned off, deactivating the remaining CNT transistors in the CNT array 212. The remaining CNT transistors do not interfere with voltages output on first output line 316 and second output line 320.

While the first row enable line 312 is activated, the logic component 208 applies a set of logic 1 values and logic 0 values to the CNT activation line 314. The logic 1 values and logic 0 values are applied separately.

The logic component 208 reads the voltage output from the first output line 316 and second output line 320 for the separate values applied to the CNT activation line 314. If the first CNT transistor 308 has metallic properties, the first CNT transistor 308 will output a voltage indicative of a logic 1 on the first output line 316 for both the logic 1 value and the logic 0 value applied to the CNT activation line 314.

If the voltage output by the CNT transistor 308 is a logic 1 for both the logic 1 value and the logic 0 value applied to the CNT activation line 314, the logic will interpret the CNT transistor 308 as having metallic properties. In this case, the logic may associate a value such as a letter "M" (for metallic) to identify the first CNT transistor 308.

If the first CNT transistor 308 has high resistive properties, the first CNT transistor 308 will output a logic 0 on the first output line 316 for both logic 1 values and logic 0 values to the CNT activation line. Thus, the logic may interpret the first CNT transistor 308 as having high resistive properties, and may associate a value such as a letter "O" (for open circuit/high resistance) with the first CNT transistor 308.

Alternatively, if the first CNT transistor 308 has semiconductive properties, the first CNT transistor 308 will output a logic 1 on the first output line 316 for logic 1 values and a logic 0 value for a logic 0 value applied to the CNT activation line. Thus, the logic will interpret the first CNT transistor 308 as having semiconducting properties, and may associate a value such as a letter "S" (for semiconducting) with the CNT 402.

The determination of the resistive properties of each CNT of the CNT array 214 is performed by a sequential activation of the row enable lines 312, 322, 324. After the resistive properties of each CNT of the CNT array 212 is determined, a key can be determined based on the resistive properties of the CNT array 212. After the key has been read by a reader 326, for example, an electronic fuse 328 may be blown, to prevent the key from being read after the semiconductor enters the supply chain.

The key corresponding to the resistive properties of the CNT transistors may be saved in a secure database, for example on a server, and the logic component as shown in more detail below.

Figure 4:
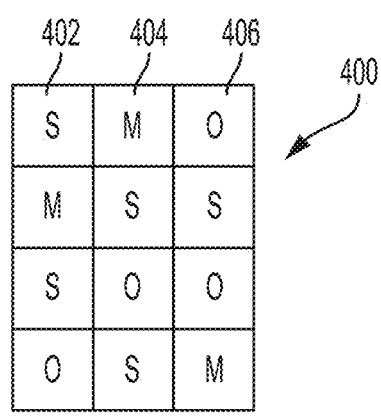
FIG. 4 illustrates a table of resistive properties of carbon nanotube transistors in accordance with an embodiment.

As depicted in FIG. 4, a partial representation of CNT array resistive properties 400 is shown. Element 402 depicts a letter "S," to indicate that a CNT with semiconductive properties was determined to be in a cell corresponding to element 402. Element 504 depicts a letter "M," to indicate that a CNT with metallic properties was determined to be in a cell corresponding to element 404. Element 406 depicts a letter "O," to indicate that a CNT with high resistive properties was determined to be in a cell corresponding to element 406. Although only three cells are shown, the key may be generated based on the total number of CNT transistors in the CNT array.

Figure 5A:
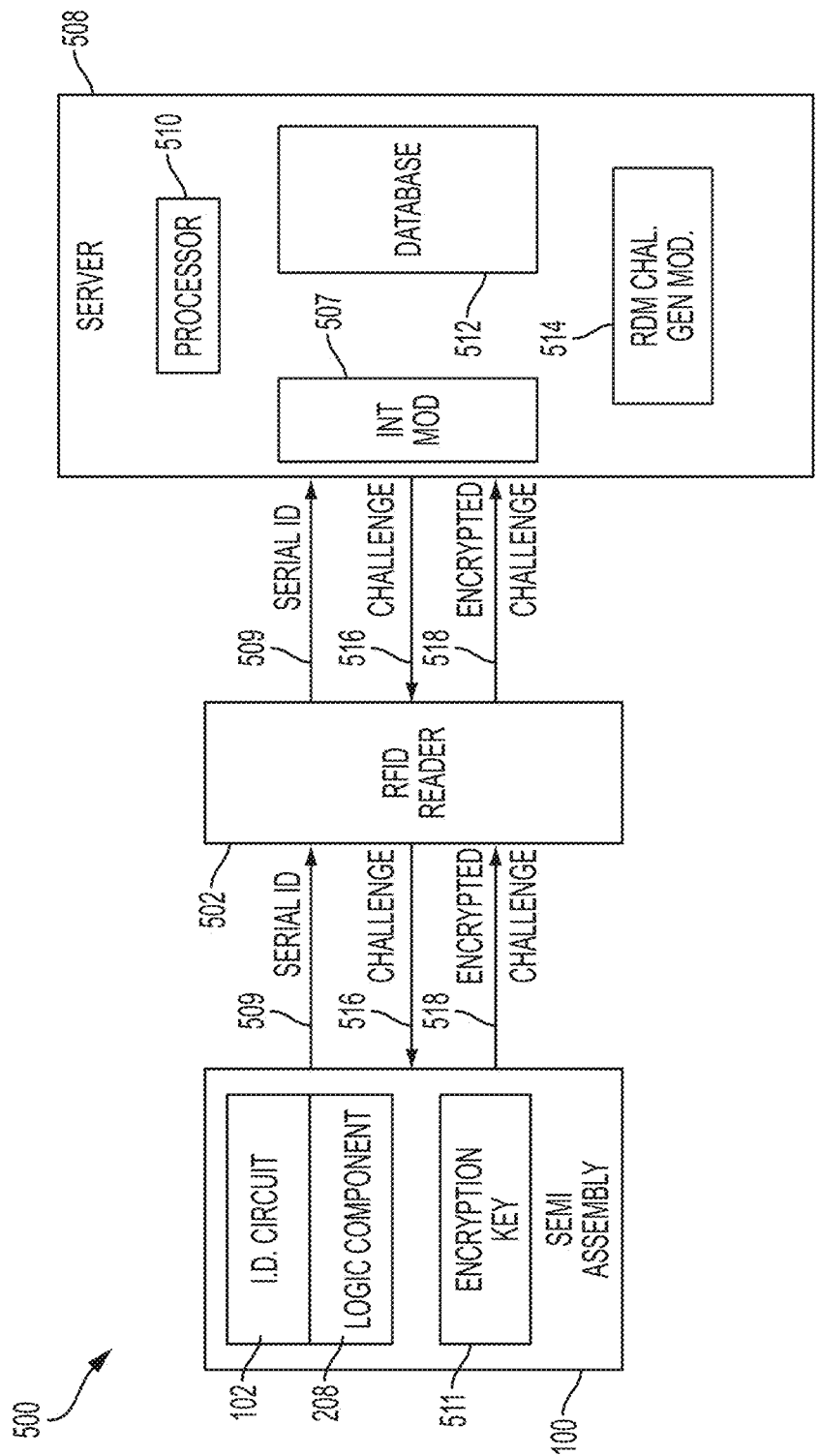
FIG. 5A depicts an operational verification system in accordance with one embodiment.

Referring to FIG. 5A, with continuing reference to FIG. 2, an operational verification system 500 in accordance with an embodiment of the invention is shown. An RFID reader 502 communicates with the ID circuit 102 of the semiconductor assembly 100 to read a serial ID 509 from the ID circuit 102. The serial ID 509 may be an output of the CNT array 212 when all CNT activation lines are set to a logic 0, for example. Alternatively, the serial ID 509 may be an output of the CNT array 212 when all CNT activation lines are set to a logic 1, or any known input string.

The RFID reader 502 may communicate with a server 508 to transmit the serial ID to the server 508. An interfacing module 507 of the server 508 may receive the serial ID 509 and communicate the serial ID 509 to a processor 510 of the server 508. The processor 510 retrieves identification information from a database 512 of the server 508, for example. The identification information can include, but is not limited to the serial ID, part type, fabrication facility name, or a part number of the semiconductor chip.

The serial ID 509 is associated with an encryption key 511 that is determined based on the resistive properties of the CNT array 212. The encryption key 511 may be securely stored in the database 512.

The server 508 further comprises a random challenge generation module 514. The random challenge generation module 514 generates a challenge 516. The challenge 516 represents a set of CNT gate voltages to be sequentially applied each CNT gate voltage line. The challenge 516 supplied by the random challenge generation module 514 may be a random string of values logic 1 values and logic 0 values.

Figure 5B:
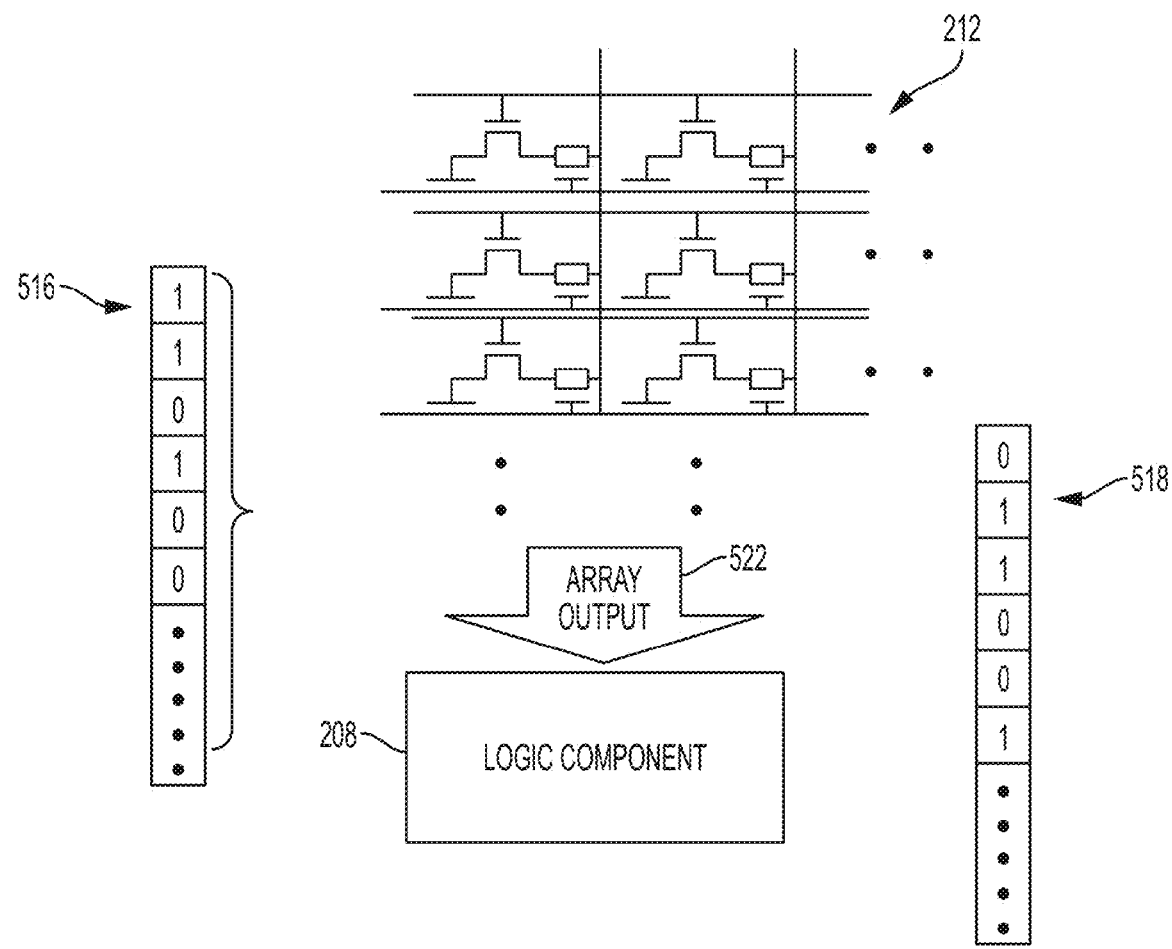
FIG. 5B depicts additional elements of an operational verification system in accordance with one embodiment.

FIG. 5B illustrates the application of the challenge 516 to the CNT array 212 and the logic component 208 in more detail. The challenge 516 is sequentially applied to each CNT gate voltage line of the CNT array 212. The logic component 208 reads the array output 522 of the CNT array 212. The logic component 208 then generates an encrypted challenge 518, which may be a function of the array output 522 and the challenge 516. Specific combinations of logic 1 values and logic 0 values are shown for the challenge 516 and the encrypted challenge 518, however other combinations are possible, including additional logic 0 and logic 1 values.

Referring back to FIG. 5A, the challenge 516 may be received by the ID circuit 102 after transmission by the RFID reader 502, for example. The encrypted challenge 518 is generated by the logic component 208 based on the challenge 516 and the encryption key 511 read from the CNT array 212. Specifically, the logic component 208 may act as an encryption engine, using the encryption key 511 to encrypt the challenge 516 to generate an encrypted challenge 518.

The encrypted challenge 518 may be transmitted to the server 508. The interfacing module of the server 508 receives the encrypted challenge 518. The processor decrypts the encrypted challenge 518 to generate a decrypted challenge 520. If the decrypted challenge 520 and the challenge 516 match, the processor can determine that the semiconductor component 100 matches the component identification from the time of manufacture.

Figure 6:
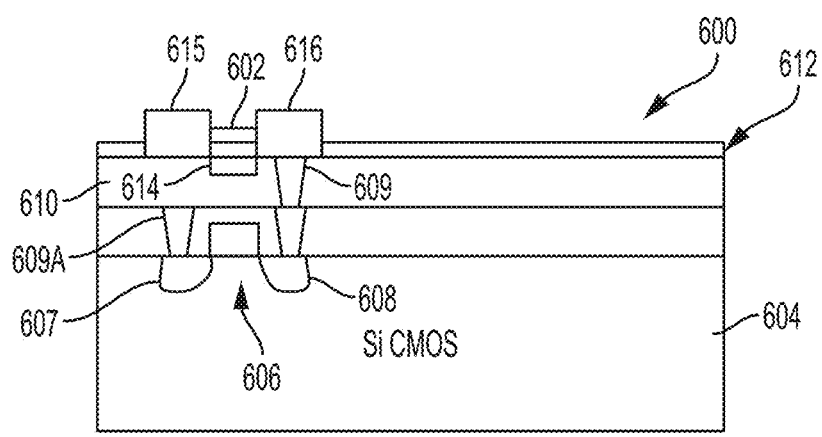
FIG. 6 depicts layers of a portion of a CNT array in accordance with one embodiment.

FIG. 6 illustrates the layers of a portion of a CNT array 600 in accordance with one embodiment of the present invention. A CNT 602 can be directly integrated on a silicon CMOS layer 604. The CNT array 600 includes the silicon CMOS layer 604 where front-end of line FEOL components are distributed, such as a p+ well or n+ well components 606 and FET source contact 607 and FET drain contact 608. Standard back end of line (BEOL) CMOS components include interconnect 609, secondary interconnect 609A and an interlayer dielectric 610 above the Si FEOL components. The CNT FEOL components can include but are not limited to an embedded gate 614, and source contact 615 and drain contact 616, for example. A CNT FEOL layer 612 is fabricated on top of the Si CMOS BEOL components. The CNT FEOL layer 612 includes a gate dielectric, the CNT 602 that is connected to source contact 607 and drain contact 608, for example.

Figure 7:
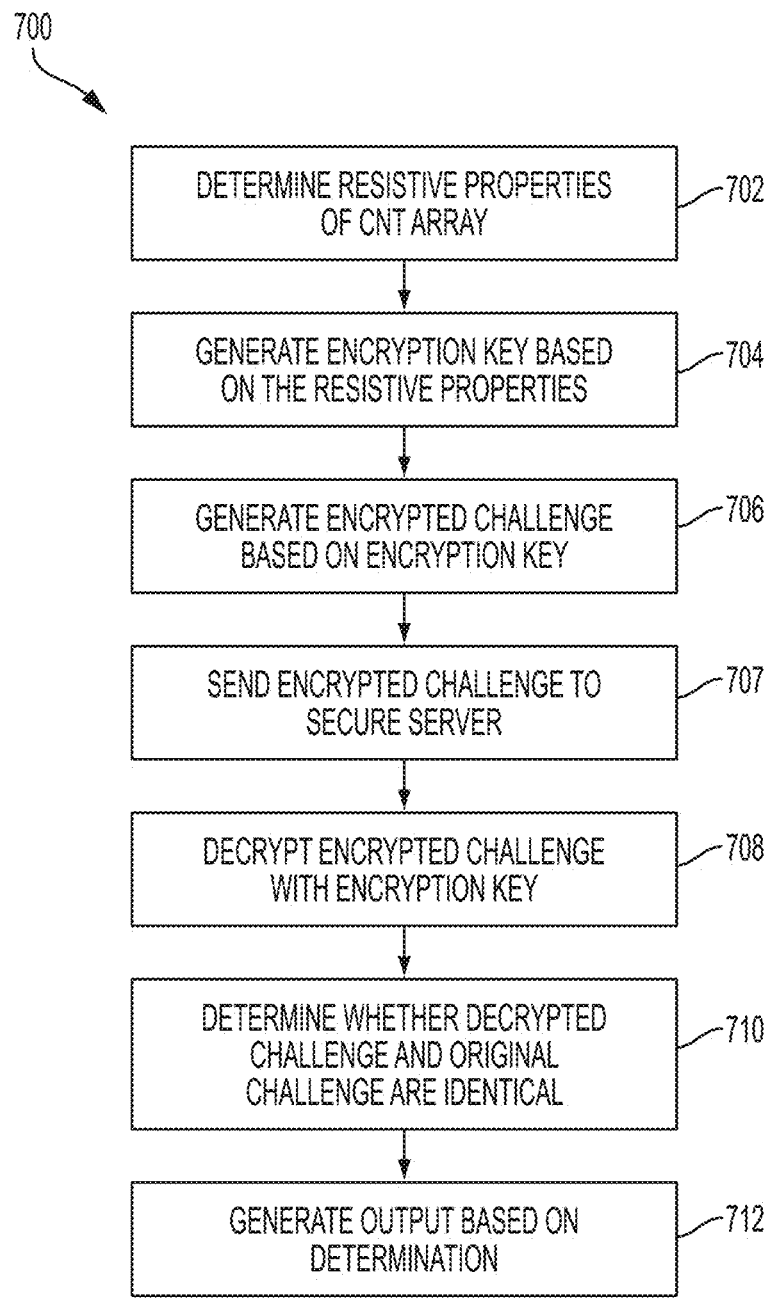
FIG. 7 depicts a method of authentication in accordance with one embodiment.

FIG. 7 illustrates a method in accordance with one embodiment. At step 702, resistive properties of a plurality of CNT transistors are determined. The resistive properties may be a representation of the individual resistive properties of each CNT, and can include whether the CNT has metallic properties, high-resistive properties, or semiconductive properties, for example. At block 704, an encryption key is generated based at least in part on the resistive properties. At 705, the secure server sends the original challenge to the authentication chip. At block 706, an encrypted challenge is generated with the original challenge and the encryption key. At 707, the encrypted challenge is sent back to the secure server. At block 708, the encrypted challenge is decrypted with the same encryption key stored in the secure server, to generate a decrypted challenge. At block 710, the original challenge and the decrypted challenge are analyzed to determine whether the original challenge and the decrypted challenge are identical. At block 712, an output is generated that the challenge and the decrypted challenge are identical.

The various embodiments of the invention have been described in the context of encoding the attribute of objects (e.g., filenames and pathnames). However, it is to be noted that the embodiments of the invention are also applicable for encoding any other attributes of the objects. For instance, ownership (e.g., group or individual) information, permission information (e.g., read, write, execute permissions), timestamps, group identifiers, fileset identifiers, user indenters, etc. of the objects may be encoded in some embodiments of the invention. These other attributes encoded into the numerical values for the objects would allow for efficiently performing operations such as "process all files of user A before those of user B" and "process all files for user A in one batch and those for user B in another batch."

The embodiments disclosed herein may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of authenticating an integrated circuit, the method comprising:
    sending, by a processor, a voltage signal to an identification circuit, wherein the identification circuit is comprised of one or more carbon nanotube transistors;
    determining, using the processor, resistive properties of the carbon nanotube transistors disposed in the identification circuit, wherein the resistive properties are permanent and predetermined;
    generating an encryption key based at least in part on the resistive properties of the carbon nanotube transistors;
    wherein generating an encryption key is based on a random distribution of resistive properties of the carbon nanotube transistors;
    generating an encrypted challenge with the encryption key and original challenge;
    decrypting the encrypted challenge with the encryption key, thereby generating a decrypted challenge;
    comparing the challenge and the decrypted challenge to determine an identity of the integrated circuit; and
    making a decision based on the comparison.

2. The method of claim 1, wherein resistive properties of the carbon nanotube transistors is based on a voltage range of −3V to 3V and includes a high resistance of greater than 1 mega-ohm, a metallic resistance of less than 1 kilo-ohm, and a semiconductive resistance of between 1 kilo-ohm and 1 mega-ohm.

3. The method of claim 1, wherein voltages represented by the challenge are selectively applied to the carbon nanotube transistors.

4. The method of claim 1, wherein the identification circuit is configured to wirelessly communicate encrypted data.

5. The method of claim 1 further comprising opening an electronic fuse to prevent any further generation of encryption keys after determining an identity of the integrated circuit.

6. The method of claim 1, wherein the identification circuit is configured as a radio-frequency identification (RFID) circuit.

7. The method of claim 1, further comprising one or more silicon transistors that selectively activate the carbon nanotube transistors.

8. The method of claim 1, wherein the method of authenticating an integrated circuit takes place on a computer server configured to communicate with the identification circuit.

* * * * *